United States Patent [19]

Maru, Jr.

[11] Patent Number: 5,460,080
[45] Date of Patent: Oct. 24, 1995

[54] MOBILE ROTISSERIE FOR MASS COOKING OF EDIBLE VERTEBRATE PRODUCTS

[76] Inventor: Robert M. Maru, Jr., 1130 Neal Ave., Wahiawa, Hi. 96786-2144

[21] Appl. No.: 360,110

[22] Filed: Dec. 20, 1994

[51] Int. Cl.⁶ .............. A47J 37/04; A47J 37/07
[52] U.S. Cl. .............. 99/420; 99/421 H; 99/427; 99/443 C; 99/448
[58] Field of Search .............. 99/339, 342, 355, 99/419–421 V, 427–448, 443 R, 443 C; 126/41 R, 41 C; 426/523, 383

[56] References Cited

U.S. PATENT DOCUMENTS

| | | | |
|---|---|---|---|
| D. 244,903 | 7/1977 | Hildebrand | 99/421 A |
| 611,595 | 10/1898 | Alderson | 99/421 H |
| 2,039,541 | 5/1936 | Lekometros | 99/339 |
| 2,467,480 | 4/1949 | Hudson | 99/419 |
| 2,655,096 | 10/1953 | Ebin | 99/443 C |
| 3,028,801 | 4/1962 | Watts | 99/419 |
| 3,734,740 | 5/1973 | Zenos | 426/383 |
| 3,866,527 | 2/1975 | Katris | 99/339 |
| 3,939,761 | 2/1976 | McGinty | 99/421 H |
| 4,158,991 | 6/1979 | Nakashima | 99/421 H |
| 4,760,776 | 8/1988 | Beidler | 99/419 |
| 4,887,727 | 12/1989 | Simmerman | |
| 5,001,971 | 3/1991 | Beller | 99/421 R |
| 5,176,068 | 1/1993 | Stuck | |

FOREIGN PATENT DOCUMENTS 94023628 10/1994 WIPO ................... 99/421 R

Primary Examiner—Timothy F. Simone
Attorney, Agent, or Firm—David H. Semmes

[57] ABSTRACT

A mobile rotisserie for mass cooking of edible vertebrate products, characterized by a wheel-mounted, open pit wherein a spit conveyor travels from end to end and plural spits engage the conveyor, the spits being rapidly rotated simultaneously as they travel the length of the rotisserie unit. Cooking products are removably impaled while being releasibly compressed on the spits by retainer and strap assemblies, each of which is held upon traveling rods, the latter of which engage the spit conveyor. The travelling rods and spits, per se, are removable during operation and successively transportable with the cooked product from the rotisserie.

10 Claims, 2 Drawing Sheets

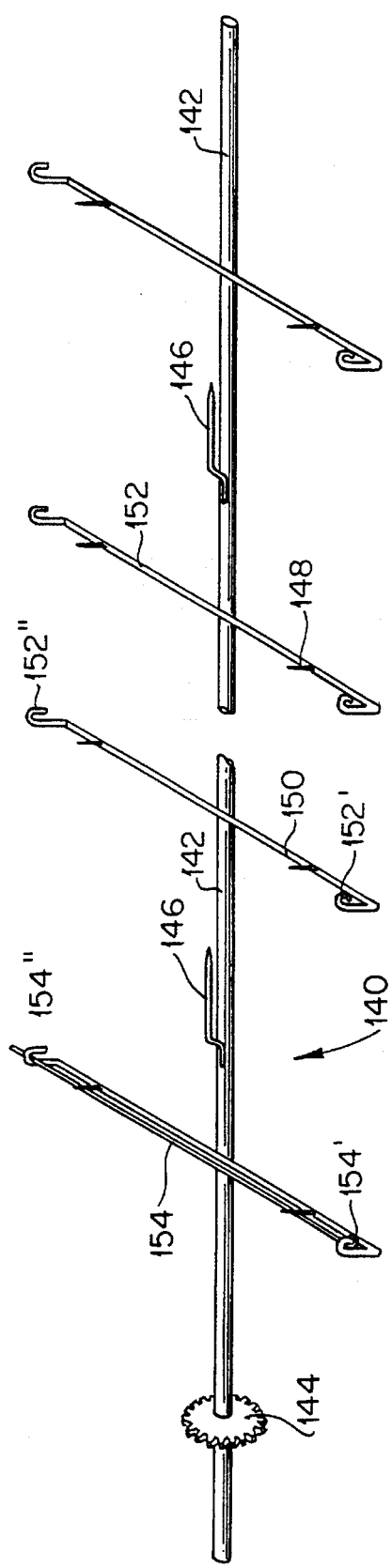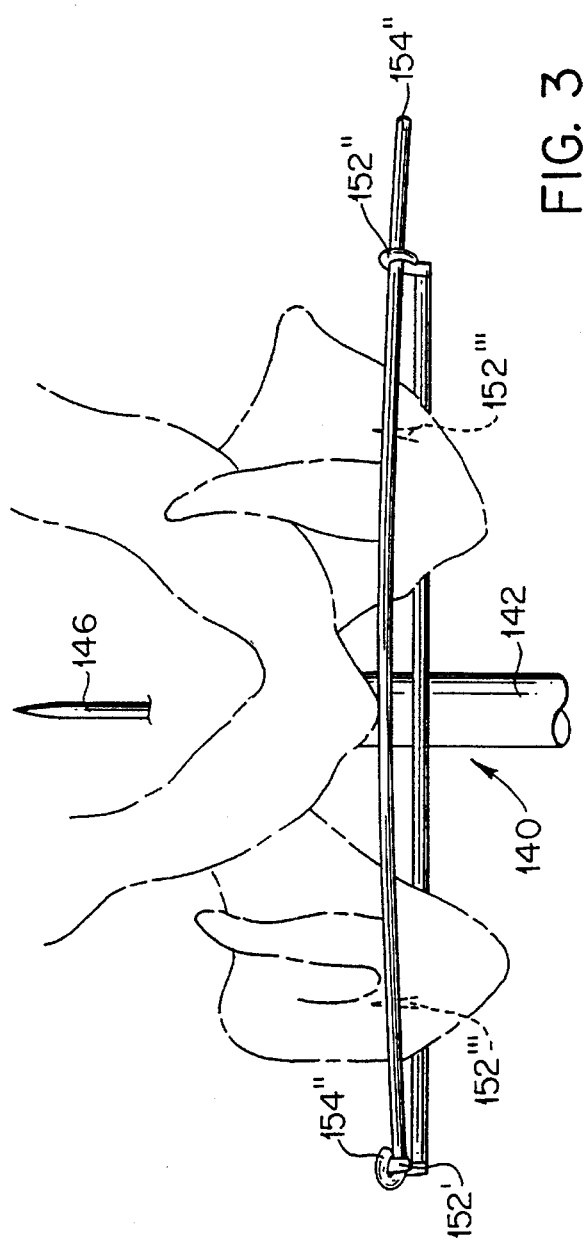

MOBILE ROTISSERIE FOR MASS COOKING OF EDIBLE VERTEBRATE PRODUCTS

BACKGROUND OF INVENTION

This invention relates to the art of cooking, more especially to the simultaneous, essentially continuous roasting, by means of a rotisserie, of vertebrate animal carcasses, for example all types of edible fowl, primarily chickens. The rotisserie is characterized by its adaptability to a mobile trailer which houses an endless conveyor wherein opposed chains extend to form a lateral transport conveyor on external walls of an extended cooking housing. The housing is exposed to the atmosphere and adapted to radiate heat from its pit by means of such particulate fuel as mesquite coals. Transverse spits laden with the carcasses are set rotatably onto rod carriers of the conveyor and after roasting the spits are readily removed from the rod carriers and from contact with an associated spit rotating drive. Unique to the spits are spaced-apart, engageable hooks which support carcass hold-on straps upon which legs and wings of the fowl may be retained such that when impaled on tines of the spit, five aligned and slightly overlapping fowl may be placed for rotational cooking. The prior art is represented by the following United States Letters Patent.

| INVENTOR | DATE | PAT. NO. | DESCRIPTION |
| --- | --- | --- | --- |
| Alderson, E. M. | Oct., 1898 | 611,595 | Broiling and Toasting Device |
| Lekometros, M. | May 1936 | 2,039,541 | Barbecuing Apparatus |
| Hudson, S. J. | April 1949 | 2,467,480 | Portable Grill |
| Ebin, B. | Oct., 1953 | 2,655,096 | Meat Broiling Apparatus |
| Watts, J. G. | April 1962 | 3,028,801 | Barbecue Spit Construction |
| Zenos, Steven | May 1973 | 3,734,740 | Continuous Food Cooking Device |
| Hildebrand | July 1977 | Des. 244,903 | Frankfurter Roasting Stick |
| Simmerman et al. | Dec., 1989 | 4,887,727 | Garment Hanger Caddy |

The present combination is unique to the mass cooking and processing of multiple carcasses for large gatherings of persons, the process generally being referred to as a rotisserie cookout system.

SUMMARY OF INVENTION

The invention is best defined in the trade as a portable automatic rotisserie chicken machine. Its function is to cook mass numbers of chickens. In its preferred assemblage, this machine will cook one hundred whole chickens in twenty minutes, three hundred chickens in one hour, due to the dimensions of the machine and related characteristics.

The size of this machine is thirty feet in length, five feet wide and thirteen inches high and adapted to convey the cooking product at one foot per minute. This machine will be sitting on a twenty-foot trailer. It is called an Automatic Rotisserie Chicken Machine because in the back of the machine there is a primary chain conveyor motor which will push a hundred retained chickens over the fire in twenty minutes. The supplemental rotisserie 30 rpm motor, is located on the left side rear of the machine, and it will spin the chickens at the same time as the primary conveyor is pushing. In operation, transfixed carcasses are rotated by the rotisserie above the cooking bed at the rate of thirty times per minute, a total of six hundred times from product implacement to removal after cooking. Chicken spits are made of stainless steel rods. Each spit will hold five whole chickens. A strap to hold each chicken down on the spit rod has a hook on one end to match the hook on the spit. There is only one way to put the strap on and it is similar to an interlocking Chinese puzzle. It as made that way so that when one takes the empty spit to another station, the strap will not fall off.

DESCRIPTION OF THE DRAWINGS

FIG. 2 is an enlarged view in perspective showing the specific cooking spit and related impaling elements such as appear in multiple alignment on travel rods.

FIG. 3 is an enlarged view of interconnection between the respective elements of the spit retainer identified hereinafter, spiked rods, aligned tines and carcass compressing strap being associated therewith.

DESCRIPTION OF PREFERRED EMBODIMENTS

Figure 1:
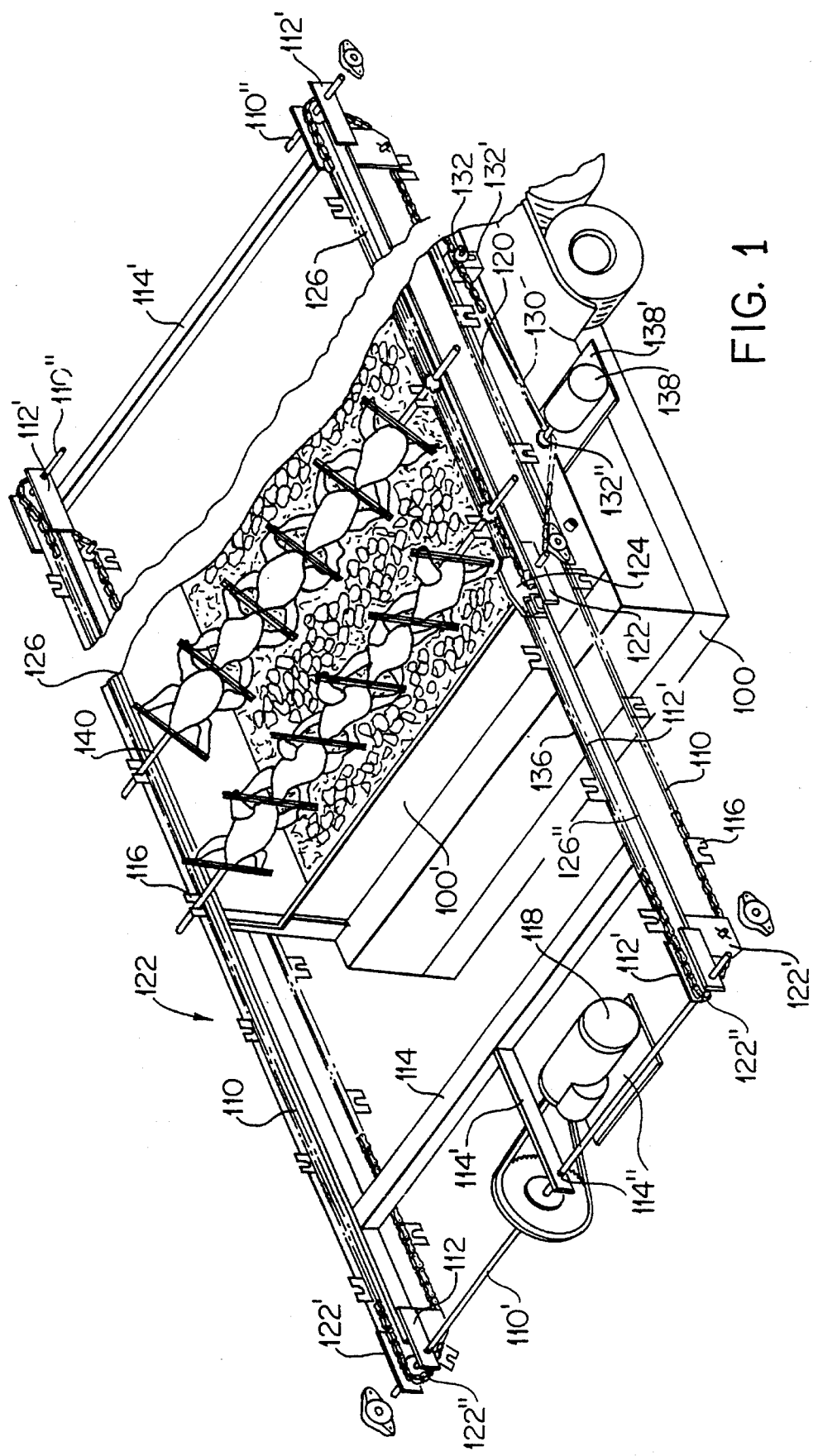
FIG. 1 represents a view in perspective of a rotisserie chicken machine unit manufactured in accordance with the invention.

The present Rotisserie Chicken Machine is adapted to portability upon a mobile wheeled trailer 100 and consists of a cooking unit 100' supported thereon. Within the trailer, main drive chains 110 travel endlessly, responsive to driven front and rear shafts 110'–110", both front and rear shafts being rotatable within shaft guides 112–112', which, in turn, are spaced by track spacers 114–114'. A #50 chain is employed as the conveyor, per se. The front drive shaft 110' has a centrally disposed driving sprocket which is held in position by the fixed track spacer connection 114'. Spit rod carriers 116 are fixed at spaced intervals to the conveyor chain, as indicated. The rod carriers 116 and their supporting chain 110 are driven by the motor 118, which rests upon a suitable motor bracket 114", shown attached to track spacer 114. There is provided a flat iron conveyor return track 120 with channels 122 set therein. Main chain idler brackets 122' cooperate with sprocket brackets 122" to effect movement to the conveyor chains 110. Suitable bridges 124 are located to support and to separate the primary righthand driving chain 110 from the secondary rotisserie driven chain 130, the latter having external disposition relative to main drive chain 110, reference righthand channel 122. Top track 126 slideably supports this #50 driven chain, lengthwise.

Rotisserie chain 130 is supported on the righthand by an idler bracket 132, followed by a sprocket bracket 132', adjacent the motor driven sprocket 132", the same being mounted on the chassis, adjacent the motor bracket 138'. Chain 130 passes to the side of bridge assembly 124 and on top of track 136. Spit 140 and its sprocket 144 will thus be caused to rise over the lower sprocket which carries the #41 secondary chain, and when the spit 140 and sprocket 144 pass over the lower sprocket, both spit and sprocket will drop onto the #41 chain and continue to be spun. The motor 138 is fixed to the chassis by the bracket 138'. See FIG. 1. Spit rods are transported by a #41 chain comprising a part of the overall rotisserie.

Referring now to the rotary chicken spits 140, FIG. 2, and driving means 138 therefor, each said spit 140 consists of travel rod 142, extending transversely of the unit 100. Rods 142 each have keyed thereto individual driven sprockets 144. These sprockets are driven by secondary chain 130. Welded in alignment on the respective spit rods 142 are Z-bars 146, effectively aligned tines, which in the illustration shown are five in number on each spit, permitting impalement of spread chickens thereon, for coactive retention by plural transverse spit retainers 150. These retainers comprise a fixed stainless steel spreader bar 152 and shiftable straps 154. Retainer spreader bars 152 include plural hooks 152'–152", the hook 152, accommodating compressed straps 154, hook 154" being engaged by the free end of the strap, whereas the opposite hook end of the strap is movable relative to the corresponding hook of the transverse retainer 150. Straps 154 are thus bendable to compress an underlying carcass upon spreader bar 152; it is likewise made of stainless steel. Thus fixed bar 152 defines at its near or righthand end, an upstanding closed hook 152' which interlocks with a corresponding hook 154' of movable strap 154. On the opposite far end of fixed bar 152 is an upstanding open hook 152" for retention of the free end of 154" of strap 154 in the operational mode of the spit retainer 140, reference FIG. 1. Thus, hooks 152' and 154' interlock such that the latter, 154' permits rotational movement of strap 154 for purposes of removal of a carcass after cooking on the rotisserie. A fresh carcass may be retained on the spit by clamping the strap 154 onto rod 152 against pairs of spread wings and spread legs of aligned carcasses, each of which is trice impaled. Impaling each aligned carcass is effected as follows: each carcass is first longitudinally engaged by a Z-bar 146; when the adjacent strap 154 is raised above its supporting rod 152. The wings and legs of a spread carcass are twice impaled by aligned spreader bar tines 152'''. Following impaling of carcass wings and legs, the carcass is strapped to rod 152 and becomes immobile, relative to spit 140, itself. Simultaneously, five carcasses with wings and legs overlapping are set upon a given spit by the impaling-strapping operation. See FIG. 1.

As indicated, this machine will cook one hundred whole chickens in twenty minutes, three hundred chickens in one hour. The effective size of this machine is thirty feet in length, five feet wide and thirteen inches high. Heating in this machine is preferably obtained by mesquite charcoal. This machine itself will be resting upon a twenty-foot-long trailer. It is called an Automatic Rotisserie Chicken Machine because in the back of the machine, the conveyor motor will push a hundred impaled and clamped chickens over the pit fire in twenty minutes. A simple, selective, enlargement of the small sprocket (not shown) of the conveyor motor will adjust the travelling time of the spits from twenty minutes to twenty-five or more minutes. The rotisserie motor, a 30 rpm motor, is located on the left side rear of the machine, and it will spin the chickens at the same time as the conveyor is pushing the spits in tandem. Due also to the relative high speed of rotation of each spit, viz: six hundred times per cooking phase, oil fats from the carcasses will not be lost to deposit on the ignited cooking coals.

I claim:

1. Mobile self-contained rotisserie, adapted to the mass cooking of vertebrate edible products, comprising:
    a) a wheel-mounted cooking oven having a cooking well pit for containment of particulate fuel, including a frame chassis (100');
    b) opposed main conveyor chains (110–110'), rotatably mounted upon frame chassis (100'), said chains bearing driven spit rod carriers (116) at spaced intervals therealong; supporting guide means (120) mounted upon the chassis in support of conveyor chains (110–110') and drives, therefor;
    c) rotisserie chain (130), likewise mounted upon the frame chassis (100'), adjacent one path defined by the conveyor chains, and support bracket and guide bracket means (132–132'), therefor;
    d) plural rotary chicken spits (140), including rotatable travel rods (142) extending transversely of the unit in rod carrier connection (116) with the opposed conveyor chains (110–110'), by means of driving sprockets (144) on the spits engaging the rotisserie chain (130);
    e) plural product retainers (150) fixed to the travel rods (142), said retainers including fixed spreader bars (152) with upstanding hooks (152'–152") at ends thereof, shiftable resilient straps (154) engaging each bar (152) at ends thereof, each said strap (154) having a hook end and a free end (154'–154"), the hook end (154') interlocking with upstanding hook (152') of respective spreader bars (152);
    f) drive means (118) for the conveyor chains (110) interconnected to a drive chain shaft (110') and drive means (138) interconnected to the rotisserie chain (130), each said drive means being mounted upon the chassis (110') in motive relation to said chains (110) and (130).

2. The mobile rotisserie according to claim 1 wherein
    g) hook (152") on the spreader bar (152) and corresponding hook (154') of strap (154) are disengageably interlocked relative to each other, and the respective hook (152'–152") of the fixed bar (152) and the free end (154") of the strap are compression engageable, the latter free end (154") being disengageable from the hook (152").

3. The mobile rotisserie of claim 2 wherein
    h) travel rods (142) carry transversely aligned Z-bar chicken carcass impalers (146).

4. The mobile rotisserie of claim 3 wherein
    i) the spreader bar (152) supports at least one fixed tine (152''') which extends vertically upward of the bar (152).

5. The mobile rotisserie of claim 4 wherein the spreader bar (152) supports plural tines (152'''), each said tine (152") being transversely aligned, relative to its respective spit (140).

6. In combination with a rotisserie wherein vertebrate edible products are conveyed and rotated into and out of a cooking zone, the improvement comprising:
    a) plural rotary chicken spits (140), including rotatable travel rods (142) extending transversely of the unit in rod carrier connection (116) with opposed conveyor chains (130), by means of driving sprockets (144) on the spits;
    b) plural retainers (150) fixed to the travel rods (142), said retainers including fixed spreader bars (152) with upstanding hooks (152'–152") at ends thereof, shiftable resilient straps (154) engaging each bar (152) at ends thereof, each said strap (154) having a hook end and a free end (154'–154"), the hook end interlocking with upstanding hook (152') of respective spreader bars;
    c) drive means (118) for the conveyor chains (110) interconnected to a drive chain shaft (110') and drive means (138) interconnected to the rotisserie chain (130), each said drive means being mounted upon a chassis (110') in motive relation to said chains (110) and (130).

7. The combination with a rotisserie according to claim 6 wherein
    d) hook (152') on the spreader bar (152) and corresponding hook (154') of strap (154) are disengageably interlocked relative to each other, and the respective hook (152'–152") of the fixed bar (152) and the free end (154") of the strap are compression engageable, the latter free end (154") being disengageable from the hook (152").

8. The combination with a rotisserie according to claim 7 wherein e) travel rods (142) carry transversely aligned Z-bar chicken carcass impalers (146).

9. The combination with a rotisserie according to claim 8 wherein f) spreader bar (152) defines at least one tine (152''') which extends vertically upward of the bar (152).

10. The mobile rotisserie of claim 9 wherein the spreader bar (152) supports plural tines (152'''), each said tine (152") being transversely aligned, relative to its respective spit (140).

* * * * *